United States Patent [19]

Wroczynski

[11] Patent Number: 4,684,669

[45] Date of Patent: Aug. 4, 1987

[54] MODIFIED POLYPHENYLENE ETHER RESINS HAVING IMPROVED FOAMABILITY AND METHODS OF MAKING THE SAME

[75] Inventor: Ronald J. Wroczynski, Delmar, N.Y.

[73] Assignee: General Electric Company, Selkirk, N.Y.

[21] Appl. No.: 926,429

[22] Filed: Nov. 3, 1986

[51] Int. Cl.$^4$ ............................................. C08J 9/10
[52] U.S. Cl. ........................................ 521/90; 521/94; 521/97; 521/139; 521/180
[58] Field of Search ................. 521/180, 139, 97, 94, 521/90

[56] References Cited

U.S. PATENT DOCUMENTS

| | | | |
|---|---|---|---|
| 3,442,829 | 5/1969 | Moore et al. | 521/180 |
| 3,492,249 | 1/1970 | Pezarro et al. | 521/180 |
| 3,781,233 | 12/1973 | Muller et al. | |
| 3,947,387 | 3/1976 | Lundberg | |
| 4,097,425 | 6/1978 | Niznik | 521/180 |
| 4,174,432 | 11/1979 | Niznik | 521/180 |
| 4,197,370 | 4/1980 | Fox | 521/180 |
| 4,280,005 | 7/1981 | Fox | |
| 4,288,560 | 9/1981 | Kerchmayr et al. | 521/180 |
| 4,334,030 | 6/1982 | Kochanowski | 521/180 |
| 4,467,051 | 8/1984 | Finoz et al. | 521/180 |
| 4,594,208 | 6/1986 | Krutchen et al. | 521/180 |
| 4,607,059 | 8/1986 | Kmiec et al. | 521/180 |

*Primary Examiner*—Morton Foelak
*Attorney, Agent, or Firm*—Hedman, Gibson, Costigan & Hoare

[57] ABSTRACT

The production of foamed articles of polyphenylene ether resins is improved by including a modifier comprising an alpha, beta-unsaturated carboxylic acid or derivative. The resulting products are lightweight, exhibit superior heat resistance and retain flame retardancy over polyphenylene ether resins which are foamed in the absence of the modifier. Such resins are especially suited for the production of extrusion and injection foam molding materials.

13 Claims, No Drawings

MODIFIED POLYPHENYLENE ETHER RESINS HAVING IMPROVED FOAMABILITY AND METHODS OF MAKING THE SAME

FIELD OF THE INVENTION

The present invention relates to modified polyphenylene ether resins which can be easily foam molded to very low densities. Such improvements are brought about by incorporating into a polyphenylene ether resin an effective amount of a modifier comprising at least one alpha, beta-unsaturated carboxylic acid ester or a maleimide or derivative thereof and a foaming agent. As a result of the present invention, polyphenylene ether resin compositions are provided with enhanced utility, e.g., as light-weight extrusion and injection molding materials having good flame retardancy.

BACKGROUND OF THE INVENTION

Polyphenylene ether resins are high performance naturally flame retardant engineering thermoplastics having relatively high melt viscosities and softening points (i.e., in excess of 200° C.). They are useful for many commercial applications requiring high temperature resistance and can be formed into films, fibers and molded articles. However, the art has recognized that polyphenylene ethers have a major drawback which is that they can not be easily melt processed and foam molded, particularly to very low densities.

Polyphenylene ethers have been combined with polystyrene resins to improve moldability. For example, Cizek, U.S. Pat. No. 3,383,435 discloses that improved processability of polyphenylene ether can be obtained by the addition of polystyrene and copolymers containing polystyrene including rubber-modified high impact polystyrene.

More recently, Haaf et al., U.S. Pat. No. 4,536,500 disclosed adding a styrene resin and an impact modifying agent to polyphenylene ether to improve mold flow properties. The impact modifying agent comprises an elastomeric block copolymer of a vinyl aromatic compound and a conjugated diene and a hydrogenated derivative of the same. These efforts have also improved the foamability of the polyphenylene ether composition. However, it is also known that the addition of polystyrene tends to degrade the inherent flame retardant properties of the polyphenylene ether, and this necessitates the introduction into the composition of still another component, namely, a flame retardant agent.

For example, it has been disclosed in the art that certain halogenated compounds, and brominated compounds in particular, are effective as flame retardant additives for polyphenylene ether-polystyrene blends. An example of such a disclosure is Reinhard, U.S. Pat. No. 3,809,729.

There has also be described in Gallucci and Wroczynski Ser. No. 901,434 filed Aug. 28, 1986, that precompounding of at least one alpha, beta-unsaturated acid ester or maleimide or derivative thereof improves the processability and oxidative stability of polyphenylene ether resin compositions.

Foaming agents are customarily employed to be make moldable compositions including compositions containing polyphenylene ether resins. Foaming agents tend to reduce the weight of a thermoplastic composition to achieve lightweight properties by decomposing under reaction conditions with the evolution of gas. Foaming agents have been used to obtain foamable compositions of a variety of thermoplastic materials as described in, for example, Muller et al., U.S. Pat. No. 3,781,233 and Fox, U.S. Pat. No. 4,280,005 and the U.S. and British patent references cited therein. Lundberg, U.S. Pat. No. 3,947,387 and Liu, U.S. Pat. No. 4,588,754 disclose foamed polymeric products using citric acid, alone or citric acid mixed with sodium bicarbonate as foaming agents.

Despite these efforts, however, there is still an important need in the industry to improve the foamability of polyphenylene ether resins without incorporating other components such as polystyrene which may detract from the properties of polyphenylene ether.

Applicant has now discovered that a high quality foamable composition of polyphenylene ether resin can be obtained by the precompounding thereof with at least one carboxylic acid ester or maleimide or derivative thereof and then adding a suitable foaming agent to the modified polyphenylene ether resin. The present foamable composition retains its flame retardant properties thereby eliminating the necessity of introducing polystyrene and a flame retardant agent into the composition.

Moreover, the compositions can be easily foam-molded to very low densities, e.g., about 40-50% weight reduction compared to standard injection molded parts, using foam molding conditions and blowing agent concentrations which are conventional for other engineering thermoplastic foams.

It is therefore an object of the present invention to provide a polyphenylene ether resin composition with improved foam molding properties.

It is a further object of the invention to improve the foam molding properties of polyphenylene ether resins and to provide products having excellent flame retardancy.

It is a still further object of the invention to provide a polyphenylene ether composition which can be easily foam molded, even in the absence of polystyrene.

SUMMARY OF THE INVENTION

According to the present invention there is provided a composition containing a predominant amount of polyphenylene ether resin, a foaming agent, and an effective, flow-promoting and oxidative-stabilizing amount of a functionalizing modifier therefor comprising (i) a compound of the formula:

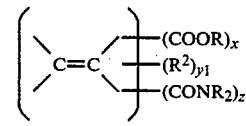

wherein R is selected from alkyl, aryl, alkaryl, haloalkyl, haloaryl or haloalkaryl; $R^1$ is selected independently from hydrogen, alkyl, aryl or alkaryl; $R^2$ is the same as defined for R and, in addition, hydrogen or halogen, preferably, chlorine or bromine, the total number of carbon atoms in R, $R^1$, $R^2$ being up to about 50; x, y and z each being 0 or an integer selected from 1, 2, 3 or 4; x+y+z being equal to 4 and x+z being at least 2;

(ii) a compound of the formula:

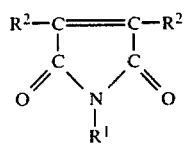

wherein $R^1$ and $R^2$ are as above defined; or
(iii) a mixture of (i) and (ii).

The present invention also provides a method of improving the mold flow properties of a polyphenylene ether resin, the method comprising adding an effective amount of a functionalizing modifier as defined above, and light-weight foamed articles made from such methods which are particularly suited as light weight structural substitutes for metals.

In preferred features, the polyphenylene ether resins will comprise poly(2,6-dimethyl-1,4-phenylene ether) and copolymers thereof, and the preferred modifiers will comprise dialkyl maleate or fumarate esters, as well as dialkylaryl maleate or fumarate esters. The modifier will preferably comprise from 0.1 to 20%, especially preferably from 0.5 to 5.0% by weight of the total composition.

Articles formed from the new compositions find particular use in building materials where light weight, high heat distortion temperatures, good flame retardancy and high stiffness are important characteristics.

DETAILED DESCRIPTION OF THE INVENTION

The polyphenylene ethers (also known as polyphenylene oxides) used in the present invention are a well known class of polymers which have become very useful commercially as a result of the discovery by Allan S. Hay of an efficient and economical method of production (See, for example, U.S. Pat. Nos. 3,306,874 and 3,306,875, which are incorporated herein by reference). Numerous modifications and variations have since been developed but, in general, they are characterized as a class by the presence of arylenoxy structural units.

The present invention includes all such variations and modifications, including but not limited to those described hereinafter.

The polyphenylene ethers favored for use in the practice of this invention generally contain structural units of the following formula

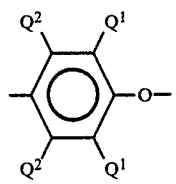

(I)

in which in each of these units independently each $Q^1$ is hydrogen, halogen, primary or secondary lower alkyl (i.e., alkyl containing up to 7 carbon atoms), phenyl, haloalkyl or aminoalkyl wherein at least two carbon atoms separate the halogen or nitrogen atom from the benzene ring, hydrocarbonoxy, or halohydrocarbonoxy wherein at least two carbon atoms separate the halogen and oxygen atoms; and each $Q^2$ is independently hydrogen, halogen, primary or secondary lower alkyl, phenyl, haloalkyl, hydrocarbonoxy or halohydrocarbonoxy as defined for $Q^1$. Examples of suitable primary lower alkyl groups are methyl, ethyl, n-propyl, n-butyl, isobutyl, n-amyl, isoamyl, 2-methylburyl, n-hexyl, 2,3-dimethylbutyl, 2-, 3- or 4-methylpentyl and the corresponding heptyl groups. Examples of secondary lower alkyl groups are isopropyl, sec-butyl and 3-pentyl. Preferably, any alkyl radicals are straight chain rather than branched. Most often, each $Q^1$ is alkyl or phenyl, especially $C_{1-4}$ alkyl, and each $Q^2$ is hydrogen.

Both homopolymers and copolymers are included. Suitable homopolymers are those containing, for example, 2,6-dimethyl-1,4-phenylene ether units. Suitable copolymers include random copolymers containing such units in combination with, for example, 2,3,6-trimethyl-1,4-phenylene ether units. Many suitable random copolymers, as well as homopolymers, are disclosed in the patent literature, including various Hay patents. Also contemplated are graft copolymers, including those prepared by grafting onto the polyphenylene ether chain such vinyl monomers as acrylonitrile and vinyl aromatic compounds (for example, styrene), and such polymers as polystyrenes and elastomers. Still other suitable polyphenylene ethers are the coupled polyphenylene ethers in which the coupling agent is reacted with the hydroxy groups of the two polyphenylene ether chains to increase the molecular weight of the polymer. Illustrative of the coupling agents are low molecular weight polycarbonates, quinones, heterocycles and formals.

The polyphenylene ether generally has a molecular weight (number average, as determined by gel permeation chromatography, whenever used herein) within the range of about 5,000 to 40,000. The intrinsic viscosity of the polymer is usually in the range of about 0.4 to 0.6 deciliters per gram (dl./g.), as measured in solution in chloroform at 25° C.

The polyphenylene ethers may be prepared by known methods, and typically by the oxidative coupling of at least one corresponding monohydroxyaromatic (e.g., phenolic) compound. A particularly useful and readily available monohydroxyaromatic compound is 2,6-xylenol (in which for the above formula each $Q^1$ is methyl and each $Q^2$ is hydrogen), the corresponding polymer of which may be characterized as a poly(2,6-dimethyl-1,4-phenylene ether).

Any of the various catalyst systems known in the art to be useful for the preparation of polyphenylene ethers can be used in preparing those employed in this invention. For the most part, they contain at least one heavy metal compound, such as a copper, manganese or cobalt compound, usually in combination with various other materials.

Among the preferred catalyst systems are those containing copper. Such catalysts are disclosed, for example, in the aforementioned U.S. Pat. Nos. 3,306,874 and 3,306,875, and elsewhere. They are usually combinations of cuprous or cupric ions, halide ions (i.e., chloride, bromide or iodide), and at least one amine.

Also preferred are catalyst systems containing manganese. They are generally alkaline systems containing divalent manganese and such anions as halide, alkoxide or phenoxide. Most often, the manganese is present as a complex with one or more complexing and/or chelating agents such as dialkylamines, alkanolamines, alkylenediamines, o-hydroxyaromatic aldehydes, o-hydroxyazo compounds, ω-hydroxyoximes (both monomeric and polypolymeric), o-hydroxyaryl oximes, and β-diketones. Also useful are cobalt-containing catalyst systems. Those skilled in the art will be familiar with patents disclosing manganese and cobalt-containing catalyst systems for polyphenylene ether preparation.

Especially useful polyphenylene ethers for the purposes of this invention are those which comprise molecules having at least one of the end groups of formulas II and III, below, in which $Q^1$ and $Q^2$ are as previously defined, each $R^1$ is independently hydrogen or alkyl, providing that the total number of carbon atoms in both $R^1$ radicals is 6 or less, and each $R^2$ is independently hydrogen or a $C_{1-6}$ primary alkyl radical.

Preferably, each $R^1$ is hydrogen and each $R^2$ is alkyl, especially methyl or n-butyl.

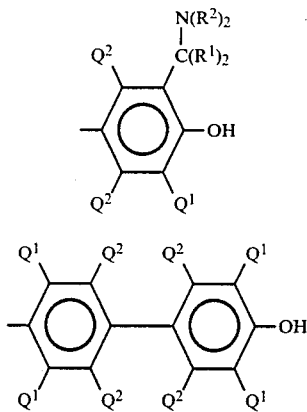

Polymers containing the aminoalkyl-substituted end groups of formula II may be obtained by incorporating an appropriate primary or secondary monoamine as one of the constituents of the oxidative coupling reaction mixture, especially when a copper- or manganese-containing catalyst is used. Such amines, especially the dialkylamines and preferably di-n-butylamine and dimethylamine, frequently become chemically bound to the polyphenylene ether, most often by replacing one of the α-hydrogen atoms on one or more $Q^1$ radicals adjacent to the hydroxy group on the terminal unit of the polymer chain. During further processing and/or blending, the aminoalkyl-substituted end groups may undergo various reactions, probably involving a quinone methide-type intermediate of formula IV, below ($R^1$ is defined as above), with beneficial effects often including an increase in impact strength and compatibilization with other blend components.

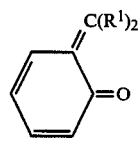

Polymers with biphenol end groups of formula III are typically obtained from reaction mixtures in which a by-product diphenoquinone of formula V, below, is present, especially in a copper-halide-secondary or tertiary amine system. In this regard, the disclosures of the U.S. Pat. Nos. 4,234,706, 4,477,649 and 4,482,697 are particularly pertinent, and are incorporated herein by reference. In mixtures of this type, the diphenoquinone is ultimately incorporated into the polymer in substantial amounts, chiefly as an end group.

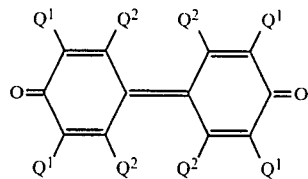

In many polyphenylene ethers obtained under the conditions described above, a substantial proportion of the polymer molecules, usually as much as about 90% by weight of the polymer, contain end groups having one or frequently both of formulas II and III. It should be understood, however, that other end groups may be present and that the invention in its broadest sense may not be dependent on the molecular structures of the polyphenylene ether end groups.

It will thus be apparent to those skilled in the art that a wide range of polymeric materials encompassing the full recognized class of polyphenylene ether resins are contemplated as suitable for use in the practice of the present invention.

The modifier compounds used as component (b) in the present invention are represented by the general formula.

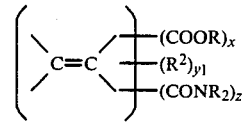

and

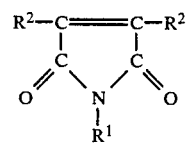

wherein R, $R^1$, $R^2$, x, y and z are as above defined. These can be made in ways known to those skilled in this art, and many of them are commercially available. One convenient procedure to make the maleate and fumarate esters is to react the corresponding acid chlorides with the corresponding alcohol, preferably in the presence of an acid acceptor. A convenient procedure to make the maleimides is to react maleic anhydride or a substituted derivative thereof with the corresponding primary amine, or to react maleimide with the corresponding alkyl or aryl halide, preferably under acid binding conditions.

The preferred flow promoting compounds used in the present invention are alpha, beta-dicarboxylic acids, dialkyl maleates and fumarates, and N-alkyl and N-aryl maleimides, and mixtures thereof especially dimethyl maleate, dibutyl maleate, diethylhexyl maleate (dioctyl maleate), ditridecyl maleate, dicyclohexyl maleate, dibutyl fumarate, diethylhexyl fumarate, ditridecyl fumarate, dibenzyl fumarate, mixtures of dialkyl fumarates, N-phenyl maleimide or mixtures of any of the foregoing.

The foaming agents used in this invention include those disclosed in previously mentioned Muller et al., U.S. Pat. No. 3,781,233; Fox, U.S. Pat. No. 4,280,005;

Lundberg, U.S. Pat. No. 3,947,387 and Liu, U.S. Pat. No. 4,588,754, all incorporated herein by reference.

More specifically, foaming agents which may be employed in the present invention include substituted bisbenzazimides as disclosed in Muller et al. and foaming agents containing decomposable groups such as azo, N-nitroso, carboxylate, carbonate, heterocyclic nitrogen containing groups and sulfonyl hydrazide groups as disclosed in Fox et al. Gaseous agents are also contemplated and include gaseous fluorocarbons as well as gases such as nitrogen, carbon dioxide, air, helium, argon, and krypton. Preferred foaming agents of this type include dinitrosopentamethylene tetramine, p-toluene sulfonyl semicarbazide, 5-phenyltetrazole, calcium oxalate and trihydrazino-s-triazine. Especially preferred foaming agent in the present invention is 5-phenyl-3,6-dihydro (1,3,4) oxadiazin-2-one.

The Lundberg and Liu patents mentioned above disclose additional foaming including sodium bicarbonate, citric acid and mixtures thereof which are preferred foaming agents employed in the present invention.

Especially preferred are the Hydrocerol-A (hydrophobized anhydrous citric acid), Hydrocerol-HT (sodium bicarbonate) and Hydrocerol Compound (citric acid/sodium bicarbonate). Special mention is made of Hydrocerol CLM70 supplied by Henley and Company, New York, N.Y.

This formulation contains a polyethylene wax binder and has about 70% by weight of active ingredients. The decomposition temperature range is generally from about 150° C. to about 210° C., and the sole gaseous decomposition product is carbon dioxide. These are preferred because neither the gaseous nor the solid decomposition products have deleterious effects on the thermoplastic polymers. Furthermore, unlike numerous other foaming agents, these foaming agents do not need the presence of nucleating agents or activators in order to achieve uniformity of cells, although it is preferred. Additionally, these foaming agents produce foams having the most uniform, fine cellular structure.

The foaming agent can be added as a solid powder, a dispersion in an inert liquid or with a diluent such as silica or a neutral clay or as a concentrate wherein a high concentration of the foaming agent is carried in a carrier polymer such as, for example, polyethylene. The particle size of the foaming agent is usually sufficiently small to facilitate uniform blending with the thermoplastic polymers and is generally less than about 50 microns. However, since many commercial foaming agents are available in aggregate form, the particular size of the aggregate will be somewhat larger.

The amount of foaming agent dispersed in the thermoplastic is that amount which is sufficient to provide a uniform, essentially closed cell foam manifesting the desired weight reduction and other physical properties. The density of the foam is preferably in the range of about 0.4 to 1.2 g/cc, more preferably from about 0.6 to 1.0 g/cc.

The amount of foaming agent used for the desired foam density will depend on the particular foaming agent selected, on the amount of gas generated by it upon decomposition and will depend on the particular melt blending and extrusion process selected because the efficiency of the foaming agent can be affected by the tendency of a particular melt extruder to allow gaseous products to escape from the extruder. In general, the amount will range from about 0.05 to about 1.5% by weight based on the polymer, preferably from about 0.1 to about 0.8% by weight, based on the polymer, to provide a sufficient degree of foaming without yielding an undesirably low density or open pore structure.

In formulating the compositions in accordance with the present invention, amounts for the abovementioned components of the composition fall within certain ranges, as follows.

| COMPONENTS | AMOUNT (Parts by Weight) | PREFERRED AMOUNTS |
|---|---|---|
| (a) polyphenylene ether | 1 to 99 | 94 to 99 |
| (b) modifier | 0.1 to 20 | 0.5 to 5 |
| (c) foaming agent | 0.05 to 1.5 | 0.1 to 0.8 |

The specified amounts are based on 100 parts by weight total of (a), (b) and (c) combined.

The present compositions can also be formulated to include other ingredients in addition to those just described. These may be selected from among conventional materials commonly employed in polyphenylene ether resin blends. Examples are plasticizers, mold release agents, melt viscosity reducers, colorants, stabilizers, antioxidants, mineral fillers (for example, clay), glass reinforcements, titanium oxides, lubricants, fragrances and so forth. Conventional amounts varying, for example, from less than 1 to greater than 50 percent by weight, per 100 percent by weight of the total composition, may be utilized.

Generally, the structural foams of the present invention may be prepared by any of the known methods in the art. For example, the foams may be prepared by dry mixing the foaming agents and polymer composition, and thereafter melt blending the composition in an extruder. The foams may be injection molded, extruded and the like to produced finished articles to stock materials.

DESCRIPTION OF THE SPECIFIC EMBODIMENTS

The invention is further illustrated in the description below, which is set forth to show a preferred or best embodiment.

EXAMPLE 1

A composition is prepared comprising a polyphenylene ether resin (intrinsic viscosity, IV, 0.46 dl/g) and dioctylmaleate. The composition is extrusion blended in a 30 mm Werner-Pfleiderer twin-screw extruder with a melt temperature of 572° to 600° F. and comminuted into molding pellets. It is then foam molded into workpieces using a Toshiba injection foam molding machine with a stock temperature of about 600 F. and mold temperature of 200 F. In the minimum density experiment, plaques 5"×5"0.25" were molded under the same machine conditions and with the same levels of blowing agent. The shot size was progressively decreased for each formulation until the expanding gaseous melt could no longer fill the mold. The density obtained for the part which could be barely filled at the lowest shot size is designated the minimum density. These data are considered to be proportional to the ease of foamability of the resin—the lower the minimum density the more easily foamed is the resin. For comparison purposes, workpieces are also molded from an identical composition compounded without dioctylmaleate and also another composition compounded with mineral oil, a common plasticizer, substituted for dioctylmaleate. The formulations used and the results obtained are set forth in Table 1:

TABLE 1

FOAMED POLYPHENYLENE ETHER COMPOSITIONS

| EXAMPLE | 1 | 1A | 2 |
|---|---|---|---|
| COMPOSITION (parts by weight) | | | |
| Poly(2,6-dimethyl-1,4-phenylene ether) 0.46 dl/g intrinsic viscosity | 100 | 100 | 100 |
| Dioctyl maleate | 2 | 0 | 0 |
| Mineral Oil | 0 | 0 | 2 |
| 5-Phenyl-3,6-dihydro (1,3,4) oxadiazin-2-one | 0.25 | 0.25 | 0.25 |
| MINIMUM DENSITY ACHIEVE-ABLE (g/cc) in a 5" × 5" × 0.25" plaque | 0.66 | 0.71 | 0.71 |
| FOAM PROPERTIES (@ 0.95 g/cc density) | | | |
| FLEX MOD (kpsi) | 310 | 308 | 317 |
| FLEX STR (kpsi) | 14.3 | 14.0 | 14.7 |
| HDT (°F.) @ 264 psi | 340 | 354 | 344 |
| UL 94 RATING @ ¼" section | V0 | V1 | V0 |
| AVERAGE FLAME OUT TIME (sec) | 2.5 | 5 | 3.4 |

The composition of the present invention containing the dioctylmaleate modifier achieves a significant additional lower density as compared with the unmodified comparative product while retaining most of the heat resistance and flame retardancy of the unmodified product.

EXAMPLES 3–6

Formulations utilizing crystal polystyrene and high impact polystyrene were made as comparative examples of methods of enhancing the foamability of polyphenylene ethers. The compositions are foam molded and tested for minimum achievable density, flame retardancy and heat resistance. The compositions used and the results obtained are set forth in Table 2:

TABLE 2

COMPARATIVE FOAMED POLYPHENYLENE ETHER COMPOSITIONS

| EXAMPLE | 1A | 1 | 3 | 4 | 5 | 6 |
|---|---|---|---|---|---|---|
| COMPOSITIONS (parts by weight) | | | | | | |
| Poly(2,6-dimethyl-1,4-phenylene ether) 0.46 dl/g intrinsic viscosity | 100 | 100 | 90 | 80 | 65 | 80 |
| Dioctyl maleate | 0 | 2 | 0 | 0 | 0 | 0 |
| Crystal Polystyrene (a) | 0 | 0 | 10 | 20 | 35 | 0 |
| HIPS (b) | 0 | 0 | 0 | 0 | 0 | 20 |
| 5-Phenyl-3,6-dihydro(1,3,4) oxadiazin-2-one | 0.25 | 0.25 | 0.25 | 0.25 | 0.25 | 0.25 |
| MINIMUM DENSITY ACHIEVABLE (g/cc) in a 5" × 5" × 0.25" plaque | 0.71 | 0.66 | 0.72 | 0.70 | 0.72 | 0.75 |
| FOAM PROPERTIES (@ 0.95 g/cc density) | | | | | | |
| FLEX MOD (kspi) | 308 | 310 | 332 | 341 | 355 | 316 |
| FLEX STR (kpsi) | 14.0 | 14.3 | 14.6 | 15.1 | 14.1 | 14.3 |
| HDT (°F.) @ 264 psi | 354 | 340 | 329 | 303 | 273 | 297 |
| UL 94 RATING @ ¼ section | V1 | V0 | V0 | V1 | FAIL | V1 |
| AVERAGE FLAME OUT TIME (sec) | 5 | 2.5 | 3.4 | 7.4 | 20.6 | 8.8 |

(a) Foster Grant, DYLENE ™ 8G
(b) Huntsman 1897, High impact Polystyrene

As is evident from Table 2, the incorporation of the modifiers employed in the present invention provides a polyphenylene ether composition that can be molded to a light weight yet the composition retains the heat and flame retardancy of the unmodified polyphenylene ether. In contrast, the addition of polystyrene does not enhance the ability to reach low densities and also drastically reduces the flame retardancy and heat resistance of the parts.

EXAMPLES 7–12

Examples 7–12 are prepared in the same manner as Example 1. The compositions used and the results obtained are shown in Table 3.

TABLE 3

COMPARATIVE FOAMED POLYPHENYLENE ETHER COMPOSITIONS

| EXAMPLE | 7 | 8 | 9 | 10 | 11 | 12 |
|---|---|---|---|---|---|---|
| COMPOSITIONS (parts by weight) | | | | | | |
| Poly(2,6-dimethyl-1,4-phenylene ether) 0.46 dl/g intrinsic viscosity | 100 | 100 | 0 | 0 | 0 | 0 |
| Poly(2,6-dimethyl-1,4-phenylene ether) 0.40 dl/g intrinsic viscosity | 0 | 0 | 100 | 100 | 100 | 100 |
| Dioctyl Maleate | 0 | 0 | 0 | 2 | 0 | 0 |
| Dibutyl Maleate | 2 | 0 | 0 | 0 | 2 | 0 |
| Dibutyl fumarate | 0 | 2 | 0 | 0 | 0 | 2 |
| 5-Phenyl-3,6-dihydro(1,3,4) oxadiazin-2-one | 0.25 | 0.25 | 0.25 | 0.25 | 0.25 | 0.25 |
| MINIMUM DENSITY ACHIEVABLE (g/cc) in a 5" × 5" × 0.25" plaque | 0.62 | 0.63 | 0.70 | 0.61 | 0.60 | 0.57 |
| FOAM PROPERTIES (@ 0.95 g/cc density) | | | | | | |
| FLEX MOD (kpsi) | 303 | 299 | 300 | 316 | 302 | 303 |
| FLEX STR (kpsi) | 14.2 | 14.0 | 13.8 | 14.6 | 14.2 | 14.4 |

TABLE 3-continued
COMPARATIVE FOAMED POLYPHENYLENE ETHER COMPOSITIONS

| EXAMPLE | 7 | 8 | 9 | 10 | 11 | 12 |
|---|---|---|---|---|---|---|
| HDT (°F.) @ 264 psi | 345 | 348 | 354 | 341 | 345 | 341 |
| UL 94 RATING @ ¼ section | VO | VO | VO | VO | VO | VO |
| AVERAGE FLAME OUT | 3.6 | 2.3 | 2.0 | 2.9 | 3.1 | 2.2 |

The above-mentioned patents and publications are incorporated herein by references.

Many variations of the present invention will be obvious to those skilled in this art in light of the above, detailed description. For example, instead of poly(2,6-dimethyl-1,4-phenylene ether) other resins can be used, such as poly(2,6-dimethyl-co-2,3,6-trimethyl-1,4-phenylene ether). Instead of 5-phenyl-3,6-dihydro (1,3,4) oxadiazin-2-one, as the foaming agent, bis-benzazimide, 5-phenyltetrazole, azodicarbonamide, p-toluene sulfonyl semicarbazide, citric acid, sodium bicarbonate, citric acid and sodium bicarbonate, citric acid and sodium bicarbonate, and 2,2-azobis-(2-acetoxypropane) may be used. Low boiling liquids can also be used for foaming, such as pentane, hexane, heptane, benzene, 1,2-dichloroethane and the like. Similarly, materials which are gases at room temperature can also be employed, including carbon dioxide, ammonia, dichlorodifluoromethane, sulfur dioxide, nitrogen and the like. All such obvious variations are within the full intended scope of the appended claims.

I claim:

1. A method of producing a foam molded article comprising (a) a polyphenylene ether resin, said method comprising (I) adding to component (a) an effective amount of (b) a functionalizing modifier for (a) comprising:

(i) a compound of the formula:

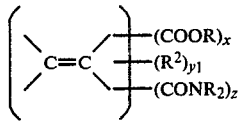

wherein R is selected from alkyl, aryl, alkaryl, haloakyl, haloaryl or haloalkaryl; $R^1$ is selected independently from hydrogen, alkyl, aryl or alkaryl; $R^2$ is the same as defined for R and, in addition, hydrogen or halogen, the total number of carbon atoms in R, $R^1$, $R^2$ being up to about 50; x, y and z each being 0 or an integer selected from 1, 2, 3 or 4; x+y+z being equal to 4 and x+z being at least 2;

(ii) a compound of the formula:

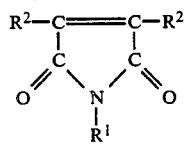

wherein $R^1$ and $R^2$ are as above defined; or
(iii) a mixture of (i) and (ii); and
(c) an effective foam generating amount for components (a) and (b) of a foaming agent, and
(II) foaming said composition.

2. The method of claim 1, wherein polyphenylene ether resin (a) is a homopolymer or copolymer containing structural units of the formula

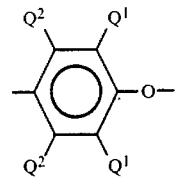

in which for each of these units independently each $Q^1$ is hydrogen, halogen, primary or secondary lower alkyl having up to seven carbon atoms, phenyl, haloalkyl or aminoalkyl wherein at least two carbon atoms separate the halogen or nitrogen atom from the benzene ring, hydrocarbonoxy, or halohydrocarbonoxy wherein at least two carbon atoms separate the halogen and oxygen atoms; and each $Q^2$ is independently hydrogen, halogen, primary or secondary lower alkyl, phenyl, haloalkyl, hydrocarbonoxy or halohydrocarbonoxy as defined for $Q^1$.

3. The method of claim 1, wherein polyphenylene ether resin (a) is a poly(2,6-dimethyl-1,4-phenylene ether).

4. The method of claim 3, wherein the poly(2,6-dimethyl-1,4-phenylene ether) has an intrinsic viscosity of about 0.3 to 0.6 deciliters per gram in choroform at 25° C.

5. The method of claim 1, wherein polyphenylene ether resin (a) is poly(2,6-dimethyl-co-2,3,6-trimethyl-1,4-phenylene ether).

6. The method of claim 1, wherein component (b) is selected from a dialkyl maleate, a dialkyl fumarate, an N-alkyl maleimide, an N-aryl maleimide or a mixture of any of the foregoing.

7. The method of claim 6, wherein component (b) is selected from dibutyl maleate, dimethyl maleate, diethylhexyl maleate, ditridecyl maleate, dicyclohexyl maleate, dibutyl fumarate, ditridecyl fumarate, dibenzyl fumarate, mixtures of dialkyl fumarates, and N-phenyl maleimide.

8. The method of claim 1, wherein component (b) is present in an amount of from about 0.1 to 20% by weight based on the weight of the overall composition.

9. The method of claim 1, wherein component (b) is present in an amount of from about 0.5 to 5.0% by weight based on the weight of the overall composition.

10. The method of claim 1, wherein the foaming agent is 5-phenyl-3,6-dihydro (1,3,4) oxadiazin-2-one.

11. The method of claim 1 wherein the foaming agent is citric acid, sodium bicarbonate of mixtures thereof.

12. The method of claim 1 wherein component (a) is present in an amount of from 1 to 99% by weight based on the overall weight of the composition.

13. The method of claim 1 wherein component (c) is present in an amount of from about 0.05 to 1.5% by weight based on the overall weight of the composition.

* * * * *